United States Patent
Ryu et al.

(10) Patent No.: US 12,222,015 B2
(45) Date of Patent: Feb. 11, 2025

(54) HYDRO BUSHING

(71) Applicants: HYUNDAI MOTOR COMPANY, Seoul (KR); KIA CORPORATION, Seoul (KR); PYUNG HWA INDUSTRIAL CO., LTD., Daegu (KR)

(72) Inventors: Yong Hyun Ryu, Seoul (KR); Chan Hee Park, Anyang-si (KR); Young Ho Kim, Gunpo-si (KR); Dae Un Sung, Incheon (KR); Gi Bong Jo, Seoul (KR); Jae Hyeok Choi, Daegu (KR); Young Bin Ju, Daegu (KR); Ho Sung Lee, Daegu (KR)

(73) Assignees: HYUNDAI MOTOR COMPANY, Seoul (KR); KIA CORPORATION, Seoul (KR); PYUNG HWA INDUSTRIAL CO., LTD., Daegu (KR)

( * ) Notice: Subject to any disclaimer, the term of this patent is extended or adjusted under 35 U.S.C. 154(b) by 128 days.

(21) Appl. No.: 17/973,053

(22) Filed: Oct. 25, 2022

(65) Prior Publication Data
US 2023/0332667 A1 Oct. 19, 2023

(30) Foreign Application Priority Data
Apr. 19, 2022 (KR) .................. 10-2022-0047991

(51) Int. Cl.
*F16F 13/14* (2006.01)
*F16F 15/023* (2006.01)

(52) U.S. Cl.
CPC ........ *F16F 15/023* (2013.01); *F16F 13/1463* (2013.01)

(58) Field of Classification Search
CPC ............... F15F 13/1409; F15F 13/1463; F15F 13/1472; F15F 15/023
USPC .................................. 267/141.2, 141.3, 141.7
See application file for complete search history.

(56) References Cited

U.S. PATENT DOCUMENTS

| 5,022,673 | A | 6/1991 | Sekino et al. |
| 7,252,298 | B2 | 8/2007 | Hughes |
| 7,306,209 | B2 | 12/2007 | Vossel et al. |
| 2003/0178754 | A1* | 9/2003 | Larmande .......... F16F 13/1409 267/140.11 |

(Continued)

FOREIGN PATENT DOCUMENTS

| JP | 2006-144837 A | 6/2006 |
| JP | 6148897 B2 | 6/2017 |
| KR | 10-1122974 B1 | 3/2012 |

*Primary Examiner* — Thomas J Williams
(74) *Attorney, Agent, or Firm* — MORGAN, LEWIS & BOCKIUS LLP

(57) ABSTRACT

A hydro bushing includes an outer pipe, an inner pipe disposed within the outer pipe and spaced apart from the outer pipe, an elastic body disposed between the outer pipe and the inner pipe and provided with a liquid chamber portion accommodating liquid therein, and a nozzle disposed between the outer pipe and the elastic body and including a stopper extending toward the liquid chamber portion such that a portion of an internal surface of the nozzle protrudes to be in contact with the liquid chamber portion. A contact end of the stopper is formed to have a surface corresponding to deformation of the elastic body caused by conical movement.

6 Claims, 7 Drawing Sheets

(56) References Cited

U.S. PATENT DOCUMENTS

| | | | |
|---|---|---|---|
| 2007/0273076 A1* | 11/2007 | Endo | F16F 13/1445 |
| | | | 267/140.4 |
| 2009/0189323 A1* | 7/2009 | Endo | F16F 13/1409 |
| | | | 267/140.12 |
| 2016/0084340 A1* | 3/2016 | Kadowaki | F16F 13/1409 |
| | | | 267/141.7 |
| 2017/0299008 A1* | 10/2017 | Satou | F16F 13/1409 |
| 2018/0216666 A1 | 8/2018 | Papic et al. | |
| 2023/0332667 A1* | 10/2023 | Ryu | F16F 15/023 |

\* cited by examiner

HYDRO BUSHING

CROSS-REFERENCE TO RELATED APPLICATION(S)

This application claims benefit of priority to Korean Patent Application No. 10-2022-0047991 filed on Apr. 19, 2022 in the Korean Intellectual Property Office, the disclosure of which is incorporated herein by reference in its entirety.

TECHNICAL FIELD

The present disclosure relates to a hydro bushing in which a contact area between a stopper of a nozzle and an elastic body is significantly secured to improve durability of the entire bushing.

BACKGROUND

For example, an elastically deformable bushing may be applied between a vehicle body and a wheel to buffer load or vibrations, generated in a forward/rearward direction or leftward/rightward direction of a vehicle, to provide higher ride quality.

A bushing may serve to structurally support a connection portion of opposite side structures and to absorb shocks, vibrations, noise, and the like, generated in one of the opposite side structures using elastic deformation thereof. However, a bushing according to the related art may not have rigidity appropriate for a driving situation of a vehicle.

To address the above-described issue of the bushing according to the related art, a hydro bushing containing a fluid has been proposed to implement more active cushioning functions. A hydro bushing may include an outer pipe, the inner pipe disposed inside the outer pipe to be spaced apart from the outer pipe, a nozzle disposed between the outer pipe and the inner pipe, and an elastic body disposed between the inner pipe and the nozzle, and a hydraulic chamber may be formed between the nozzle and the elastic body to accommodate a fluid therein.

In the case in which such a hydro bushing is disposed to be perpendicular to a vehicle such that axes of the outer pipe and the inner pipe are parallel to a vertical direction of the vehicle, when conical movement and load occurs significantly due to bumping or rebounding of a wheel, an elastic body contacting a nozzle may be excessively worn and, in a worse case, the elastic body or the nozzle may be damaged to deteriorate durability of the entire bushing.

BRIEF SUMMARY

An aspect of the present disclosure is to provide a hydro bushing in which a contact area between a stopper of a nozzle and an elastic body is significantly secured to improve durability of the entire bushing.

According to an aspect of the present disclosure, a hydro bushing according to an exemplary embodiment includes: an outer pipe; an inner pipe disposed within the outer pipe and spaced apart from the outer pipe; an elastic body disposed between the outer pipe and the inner pipe and provided with a liquid chamber portion accommodating liquid therein; and a nozzle disposed between the outer pipe and the elastic body and including a stopper extending toward the liquid chamber portion such that a portion of an internal surface of the nozzle protrudes to be in contact with the liquid chamber portion. A contact end of the stopper is formed to have a surface corresponding to deformation of the elastic body caused by conical movement.

According to an aspect of the present disclosure, a hydro bushing according to another exemplary embodiment includes: an outer pipe; an inner pipe disposed within the outer pipe and spaced apart from the outer pipe; an elastic body disposed between the outer pipe and the inner pipe and provided with a liquid chamber portion accommodating liquid therein; and a nozzle disposed between the outer pipe and the elastic body and including a stopper extending toward the liquid chamber portion such that a portion of an internal surface of the nozzle protrudes to be in contact with the liquid chamber portion. A surface of a contact end of the stopper has the same circumferential curvature as an outer radius of the inner pipe.

A gap in a load direction may be present between the nozzle and the elastic body, and a circumferential shape of the surface of the contact end may be formed by moving a virtual circle, maintaining an outer diameter of the inner pipe, by a gap with respect to a center point of the inner pipe and determining a radius of the virtual circle, equal to an outer radius of the inner pipe, as a circumferential curvature of the surface of the contact end.

The gap may range from 1.5 mm to 3 mm.

According to an aspect of the present disclosure, a hydro bushing according to another exemplary embodiment includes: an outer pipe; an inner pipe disposed within the outer pipe and spaced apart from the outer pipe; an elastic body disposed between the outer pipe and the inner pipe and provided with a liquid chamber portion accommodating liquid therein; and a nozzle disposed between the outer pipe and the elastic body and including a stopper extending toward the liquid chamber portion such that a portion of an internal surface of the nozzle protrudes to be in contact with the liquid chamber portion. A surface of a contact end of the stopper includes a linear section extending in a thickness direction, and a curved section continuous with the linear section and contacting the elastic body during conical movement.

The inner pipe may be relatively inclined by a conical angle with respect to the outer pipe during the conical movement. The linear section may be set on the surface of the contract end to include a center of a thickness of the stopper. A virtual line inclined by the conical angle with respect to a reference line extending in parallel to an axial line of the outer pipe is extended from one start point of the linear section to determine an end point meeting one side surface of the stopper. The curved section may be formed along a curve connecting the start point and the end point to each other.

The conical angle may range from −9 degrees to +9 degrees.

A length of the linear section may be within a range of 10% to 30% of a thickness of the stopper.

The hydro bushing may be disposed on an installation object such that an axial line of the outer pipe or the inner pipe is perpendicular to a ground.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
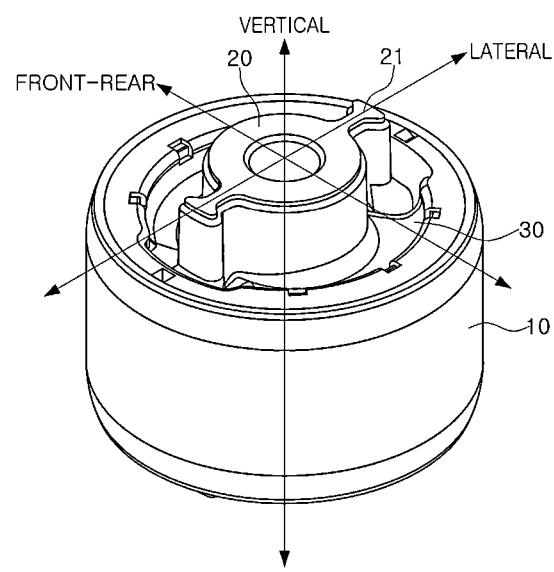
FIG. 1 is a perspective view illustrating a hydro bushing according to an exemplary embodiment in the present disclosure.

Hereinafter, exemplary embodiments in the present disclosure will be described with reference to the accompanying drawings. When allocating reference numerals to elements in the drawings, like elements are denoted, if possible, with like reference numerals, even though the elements are illustrated in different drawings. Moreover, detailed descriptions related to well-known configurations or functions will be omitted in order not to unnecessarily obscure subject matters of the exemplary embodiments of the present disclosure.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may, in one example, also be referred to as a second member, component, region, layer, or section without departing from the teachings of the examples.

In addition, the terms "vertical", "lateral", "front-rear", and the like, used in relation to the direction are defined based on a vehicle body, that is, an installation object.

Figure 2:
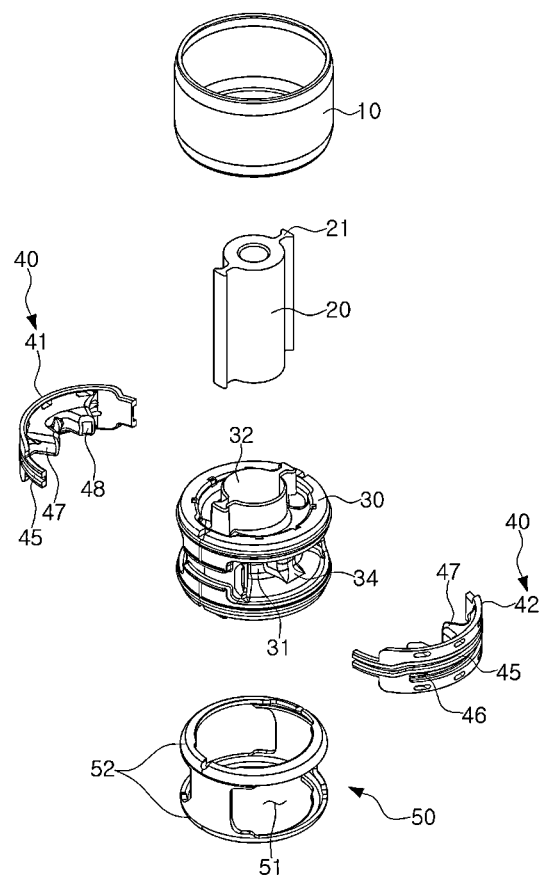
FIG. 2 is an exploded perspective view of FIG. 1.

FIG. 1 is a perspective view illustrating a hydro bushing according to an exemplary embodiment, and FIG. 2 is an exploded perspective view of FIG. 1.

The hydro bushing according to an exemplary embodiment may include an outer pipe 10, an inner pipe 20, an elastic body 30, and a nozzle 40.

The outer pipe 10 may be a substantially tubular member and may have a hollow portion therein. The nozzle 40, the elastic body 30, and the inner pipe 20 may be inserted from an internal surface of the outer pipe 10 to be disposed and coupled.

The outer pipe 10 may be formed of a rigid material, such as a metal or reinforced plastic, to protect components inserted thereinto and to be prevented from being deformed or damaged.

The outer pipe 10 may be press-fitted and coupled to one end of a lower arm constituting a suspension when, for example, the hydro bushing of the present disclosure is applied to the suspension to absorb shocks, vibrations, and the like, generated by a wheel or an engine of the vehicle. However, such an application object and such a coupling method are limited to the above-described example.

The inner pipe 20 may be a substantially tubular member, and may have a hollow portion therein. The elastic body 30 may be fitted and coupled to an external surface of the inner pipe over at least a portion of an entire length of the inner pipe. Optionally, the inner pipe and the elastic body may be bonded to each other by an adhesive or integrally molded by insert injection.

As described above, the inner pipe 20 coupled to the elastic body 30 may be disposed to be spaced apart from the outer pipe within the outer pipe 10 and to penetrate through the outer pipe 10. In addition, the inner pipe may be held within the outer pipe by, for example, an elastic body press-fitted into the outer pipe 10.

The inner pipe 20 may be formed of a rigid material such as a metal or reinforced plastic to prevent deformation or damage thereof.

The inner pipe 20 may be coupled to a frame of a vehicle body using a mounting bolt penetrating through the hollow portion of the inner pipe 20 when, for example, a hydro bushing of the present disclosure is applied to a suspension to absorb shocks, vibrations, and the like, generated by a wheel or an engine of a vehicle, to connect a lower arm constituting the suspension to the vehicle body. However, such an application object and such a connection portion are not limited to the above-described example.

The inner pipe 20 may further include a pair of protrusions 21 formed to outwardly protrude from the external surface in a radial direction. The pair of protrusions may be formed to extend over the entire length of the inner pipe 20, but exemplary embodiments are not limited thereto. The pair of protrusions 21 may be formed to extend according to a length of an elastic body fitted into the inner pipe 20 to extend in a length direction of the inner pipe 20 (a vertical direction in the drawings).

As described above, the inner pipe 20 may be provided with the protrusion 21, protruding toward the outer pipe 10, to increase bondability between the inner pipe 20 and the elastic body 30. Thus, the inner pipe 20 may more firmly support the elastic body, and a decrease in rigidity of the elastic body 30 caused by compression of the elastic body 30 may be prevented.

The elastic body 30 may be provided between the outer pipe 10 and the inner pipe 20. For example, as described above, the elastic body 30 may be fitted into the inner pipe 20 to be bonded to the inner pipe 20 by an adhesive or insert injection, and may be press-fitted into the outer pipe 10. Also, the elastic body 30 may be disposed between the inner pipe 20 and the nozzle 40.

The elastic body 30 may absorb shocks and vibrations transmitted from an external entity through the inner pipe 20. To this end, the elastic body 30 may be formed of, for example, an elastic material such as a rubber or a synthetic resin.

In addition, the elastic body 30 may include a liquid chamber portion 31 supporting displacement of the inner pipe 20 to more effectively absorb shocks and vibrations transmitted to the inner pipe 20 and to be stably bonded to the inner pipe 20, and a bonding portion 32 bonded to an external surface of the inner pipe 20 by an adhesive or insert injection.

The liquid chamber portion 31 may be formed to be inwardly concave from the external surface of the elastic body 30 in a radial direction. Also, the bonding portion 32 may be formed as an inner circumferential surface of a hole penetrating through the elastic body 30 in the vertical direction, and may be formed to extend by a length, slightly less than an entire length of the inner pipe 20.

In addition, the elastic body 30 may include a space portion 33 formed therein to prevent the liquid chamber portion 31 from being damaged by excessive displacement of the inner pipe 20 and to absorb the displacement.

In addition, the elastic body 30 may include a support portion 34 extending outwardly from the bonding portion 32 in a radial direction and relatively protruding further than the liquid chamber portion 31 to be in contact with the nozzle 40 to secure damping force.

The nozzle 40 may be disposed between the outer pipe and the elastic body 30, and may include a pair of nozzle members 41 and 42 formed to be symmetrical to each other. Since the pair of nozzle members 41 and 42 are coupled to the elastic body 30 to surround the elastic body 30, an assembling property of the nozzle 40 and the elastic body 30 may be improved.

The nozzle 40, for example, the pair of nozzle members 41 and 42 may be formed of a moldable material such as plastic. For example, a material of the pair of nozzles 41 and 42 may be engineering plastic or reinforced plastics having characteristics such as moldability, shock resistance, wear-resistance, heat resistance, and the like, but is not necessarily limited thereto.

In addition, the pair of nozzle members 41 and 42 may be disposed such that opposite side end portions thereof in a circumferential direction are adjacent to each other or in contact with each other within the outer pipe 10, and may be disposed to surround the elastic body 30, for example, the liquid chamber portion 31 of the elastic body 30 at an approximately intermediate height of the outer pipe 10. Accordingly, the nozzle 40 may be disposed between the outer pipe 10 and the inner pipe 20, for example, between the outer pipe 10 and the elastic body 30.

For example, opposite end portions of one nozzle member 41 and the other nozzle member 42 may face each other to form a nozzle 40 having a substantially tubular shape. To this end, the pair of nozzle members 41 and 42 may be formed to have a substantially semicircular cross-section.

The one nozzle member 41 and the other nozzle member 42 may seal spaces between the nozzle members 41 and 42 and the liquid chamber portion 31 of the elastic body 30, respectively, to prevent a fluid from leaking between each of the nozzle members 41 and 42 and the liquid chamber portion 31 of the elastic body. Hereinafter, a space between each of the nozzle members 41 and 42 and the liquid chamber portion 31 of the elastic body 30 will be referred to as a hydraulic chamber 43.

In addition, external surfaces of the one nozzle member 41 and the other nozzle member 42 may be in close contact with the internal surface of the outer pipe 10.

At least one flow path portion 45 may be formed on the external surface of each of the nozzle members 41 and 42 in the circumferential direction. A through-hole 46, communicating with the hydraulic chamber 43, may be formed in an end portion of the flow path portion.

Accordingly, the fluid present in the hydraulic chamber 43 between the nozzle members 41 and 42 and the elastic body 30 may flow along the flow path portion 45 as an elastic body is deformed and a volume of a hydraulic chamber is changed by transmitted shocks and vibrations. A frequency of a predetermined frequency band may be controlled and tuned by the hydraulic chamber and the flow path portion.

For example, a plurality of flow path portions 45 may be formed in each of the nozzle members 41 and 42, and one of the flow path portions of one nozzle member and one of the flow path portions of the other nozzle member may be connected to each other during assembling of the nozzle 40 to form a substantially spiral flow path portion.

Therefore, when external shocks or vibrations are applied to the hydro bushing of the present disclosure including a nozzle 40 having a plurality of flow path portions 45 formed therein, fluid may flow from the hydraulic chamber 43 to the flow path portion 45. Thus, multiple dynamic characteristics in a plurality of frequency bands may be controlled and tuned.

The nozzle 40, for example, the pair of nozzle members 41 and 42 may include at least one stopper 47 formed by a portion of an internal surface of the nozzle protruding inwardly in a radial direction. In the drawings, examples in which a plurality of stoppers are formed on each nozzle member may be provided.

The stopper 47 of the one nozzle member 41 may be formed and disposed in a position symmetrical to the stopper 47 of the other nozzle member 42 in a radial direction with respect to the center of the inner pipe 20.

The number and position of the stoppers 47 may appropriately vary depending on a design need. In addition, a thickness of the stopper (a length in the vertical direction in the drawings) and a distance between the stopper 47 and the inner pipe 20 may be changed to satisfy conditions required during a design.

The stopper 47 may be disposed inside the hydraulic chamber 43 to be spaced apart from the liquid chamber 31 of the elastic body 30, and may support displacement of the inner pipe 20 caused by the external shocks and vibrations.

For example, the stopper 47 may be inserted into the liquid chamber portion of the elastic body 30 between the elastic body 30 and the outer pipe 10 to pressurize the liquid chamber portion 31 in a radial direction of the elastic body 30 such that excessive displacement of the inner pipe 20 is prevented and the inner pipe 31 is supported via the liquid chamber portion 31 to smoothly absorb shocks and vibrations. Thus, the stopper 47 may support the inner pipe 20 together with the liquid chamber portion 31 of the elastic body 30.

As described above, the stopper 47 may be inserted into the liquid chamber portion 31 to apply a reaction force caused by displacement of the inner pipe 20 to the inner pipe 20 through the liquid chamber portion 31, thereby supporting the displacement of the inner pipe 20 and preventing excessive displacement of the inner pipe 20.

In this case, the support portion 34 of the elastic body 30 may be brought into contact with the internal surface of the nozzle 40 to support the nozzle 40, and the liquid chamber portion 31 of the elastic body 30 may be brought into contact with a contact end 48 of the stopper 47 to support the nozzle 40, so that shock-absorbing force against shocks or damping force against vibrations of the elastic body 30 may be secured.

For example, the inner pipe 20 coupled to the elastic body 30 and receiving external shocks and vibrations may be supported by the nozzle 40 and the stopper 47 through the elastic body 30, and the shocks, vibrations and the displacement of the inner pipe 20 may be absorbed by the elastic body 30.

Moreover, in the hydro bushing of the present disclosure, since fluid is present in the hydraulic chamber 43 between the nozzle 40 and the elastic body 30, when shocks and vibrations are transmitted to the hydro bushing of the present disclosure, displacement of the inner pipe 20 with respect to the outer pipe 10 may occur in the outer pipe 10. The displacement may cause deformation of the elastic body 30 to result in a change in volume of the hydraulic chamber 43, allowing the fluid in the hydraulic chamber 43 to flow. As a result, a further improved damping effect may be achieved.

In addition, the hydro bushing according to an exemplary embodiment may include an intermediate pipe 50 embedded in the elastic body 30.

The intermediate pipe 50 may have openings 51 respectively formed on opposite sides thereof to correspond to the hydraulic chamber 43. The openings 51 on the opposite sides of the intermediate pipe 50 may allow the inside and the outside of the intermediate pipe to communicate with each other. In addition, ring-shaped portions 52 formed in a circumferential direction of the intermediate pipe may be disposed on opposite ends of the intermediate pipe 50 in a vertical direction, respectively.

The intermediate pipe 50 may be formed of a moldable material such as plastic. However, exemplary embodiments are not limited thereto, and the intermediate pipe 50 may be formed of, for example, a metal.

For example, the intermediate pipe 50 may be molded to be integrated with the elastic body 30 by insert injection. In this case, the intermediate pipe 50 and the elastic body 30 may be prevented from being separated from each other.

The shocks and vibrations transmitted from the outside to the elastic body 30 may be dispersed by the intermediate pipe 50, so that the hydro bushing of the present disclosure may have rigidity and durability enough to withstand greater shocks and vibrations.

When a hydro bushing according to the related art is disposed such that axes of the outer pipe 10 and the inner pipe 20 are parallel to the vertical direction of the vehicle, for example, perpendicular to the ground, a conical movement may occur due to bumping or rebounding of a wheel.

The term "conical movement" means that, for example, when a hydro bushing is applied to a suspension of a vehicle, a lower arm constituting the suspension moves on a conical trajectory around the hydro bushing.

As described above, when greater conical movement and load occur, the elastic body 30 may be brought into contact with the nozzle 40 while being deformed, and the elastic body 30 brought into contact with the nozzle 40 may be excessively worn. In a worse case, the elastic body 30 or the nozzle 40 may be damaged.

Accordingly, there is a need for a configuration in which a gap is secured in a load direction and interference does not occur between the stopper 47 of the nozzle 40 and the elastic body 30 during the conical movement.

Figure 3:
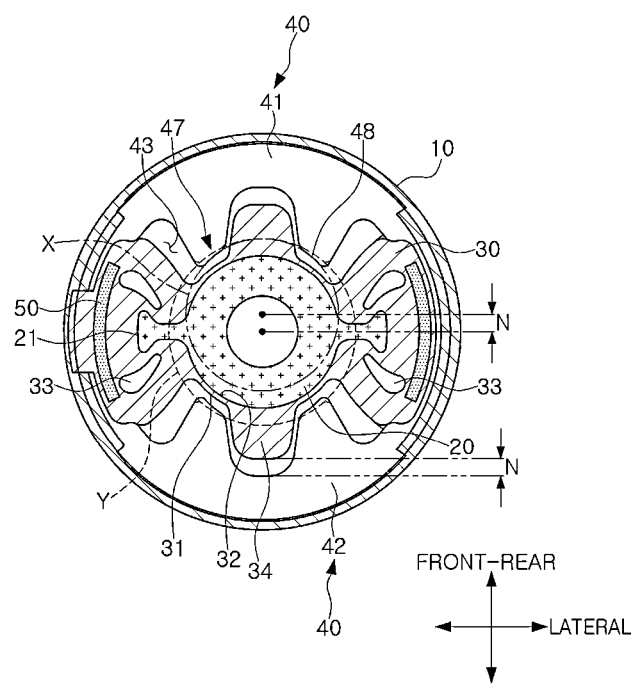
FIG. 3 is a transverse cross-sectional view of FIG. 1.
Figure 4:
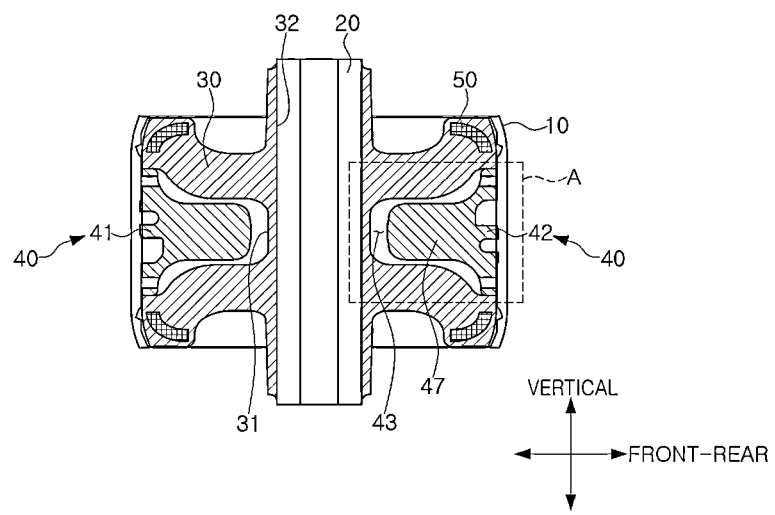
FIG. 4 is a longitudinal cross-sectional view of FIG. 1.
Figure 5:
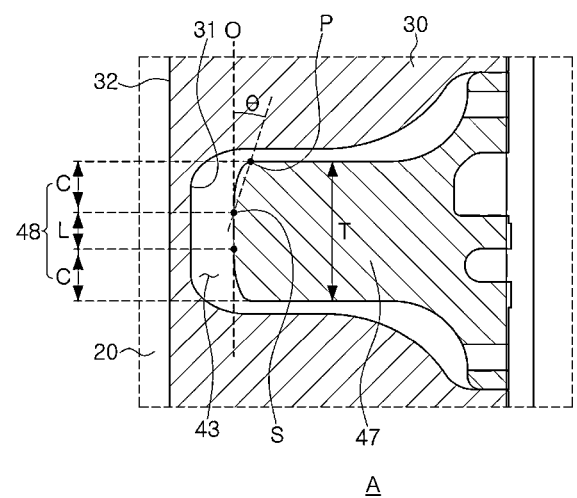
FIG. 5 is an enlarged cross-sectional view of portion "A" of FIG. 4, illustrating an action of a hydro bushing according to an exemplary embodiment in the present disclosure.
Figure 6:
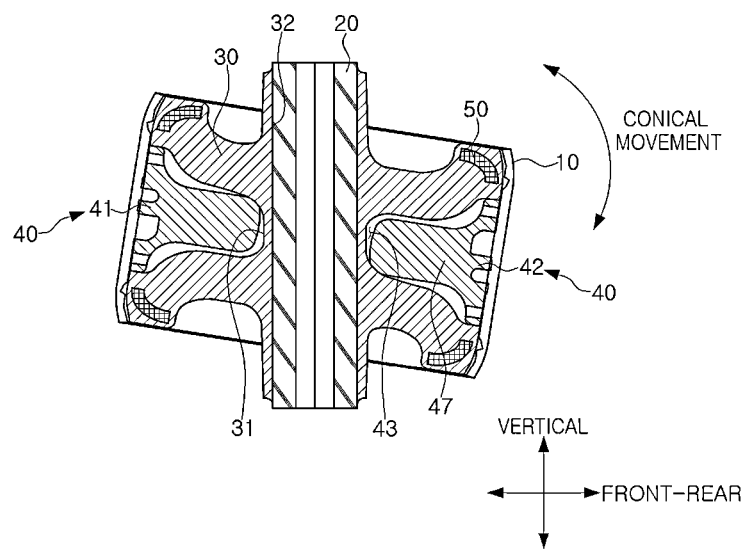
FIG. 6 is a cross-sectional view illustrating a conical movement state of a hydro bushing according to an exemplary embodiment in the present disclosure.

FIG. 3 is a transverse cross-sectional view of FIG. 1, and FIG. 4 is a longitudinal cross-sectional view of FIG. 1. FIG. 5 is an enlarged cross-sectional view of portion "A" of FIG. 4, illustrating an action of a hydro bushing according to an exemplary embodiment. FIG. 6 is a cross-sectional view illustrating a conical movement state of a hydro bushing according to an exemplary embodiment.

The hydro bushing according to an exemplary embodiment allows the contact end 48 of the stopper 47 to be in contact with the liquid chamber portion 31 with a maximum area depending on the deformation of the elastic body 30. Thus, the hydro bushing according to an exemplary embodiment may reduce contact pressure applied to the stopper 47 to delay wear of the elastic body 30, resulting in improved durability of an entire bush.

When the hydro bushing is disposed to be perpendicular to the ground such that the axes of the outer pipe 10 and the inner pipe 20 are parallel to the vertical direction of the vehicle, a main load direction may approximately correspond to a front-rear direction of the vehicle. In this case, a gap N in the load direction may be present between the nozzle 40 and the elastic body 30.

The gap N in the load direction may be calculated by reflecting a shape of the elastic body 30 of the hydro bushing and an input load. In particular, it is important to manage a maximum value of a primary characteristic section and a start value of a secondary characteristic section required for ride quality and handling performance of the vehicle.

The primary characteristic section is a section, in which a load is gradually increased or decreased depending on displacement, in a characteristic line diagram of the displacement for the load of the bushing, and the secondary characteristic section refers to a section, in which the load is rapidly increased or decreased, compared with the previous displacement, in the characteristic line diagram.

In the hydro bushing according to an exemplary embodiment, the gap N may be determined to be 1.5 to 3 mm.

For example, when the gap N is less than 1.5 mm, the ride quality may be deteriorated. Meanwhile, when the gap N is greater than 3 mm, the handling performance may be adversely affected.

After the gap N is determined, an imaginary circle (a virtual circle) (X of FIG. 3) maintaining an outer diameter of the inner pipe 20 may be moved by the gap with respect to a center point of the inner pipe 20, and a radius of the imaginary circle X, equal to an outer radius of the inner pipe 20, may be determined as a circumferential curvature of a surface of the contact end 48 of the stopper 47, as illustrated in FIG. 3.

For example, the surface of the contact end 48 of the stopper 47 may have a circumferential shape curved by a circumferential curvature, equal to the outer radius of the inner pipe 20.

In the related art, a distance obtained by summing an outer radius of an inner pipe and a gap was determined as a circumferential curvature (a dashed line Y of FIG. 3) of a surface of the contact end of the stopper 47, based on a center point of the inner pipe 20.

When a circumferential shape of the surface of the contact end 48 of the stopper 47 is determined by an outer radius of an inner pipe having a center point moved by a gap, the surface of the contact end of the stopper 47 may have a shape corresponding to an elastic body contacting while being deformed in advance depending on conical movement.

For example, when a plurality of stoppers 47 are formed on a single nozzle member 41 or 42 as illustrated in FIG. 3, an angle of a corner portion, disposed to be adjacent to the support portion 34 of the elastic body 30, in the contact end 48 of the stopper 47 may be greater than an angle of a corresponding corner portion present in a stopper according to the related art which has a circumferential curvature that is a distance obtained by summing the outer radius of the inner pipe 20 and the gap.

On the other hand, an angle of a corner portion, relatively distant from the support portion 34 of the elastic body 30, in the contact ends 48 of the stopper 47 may be smaller than an angle of a corresponding corner portion present in a stopper according to the related art which has a circumferential curvature that is a distance obtained by summing the outer radius of the inner pipe 20 and the gap.

Accordingly, in the hydro bushing according to an exemplary embodiment, a contact area between the surface of the contact end 48 of the stopper 47 and the elastic body 30, for example, an internal surface of the liquid chamber portion 31 deformed during the conical movement may be secured to be maximum.

In addition, the surface of the contact end 48 of the stopper 47 may have a shape in a thickness direction, including a linear section L extending in the thickness direction and a curved section C continuous with the linear section L and brought into contact with the elastic body 30 during conical movement.

In this case, during the conical movement, the inner pipe 20 may be relatively inclined by a predetermined angle with respect to the outer pipe 10. Hereinafter, the predetermined angle will be referred to as a conical angle θ.

In the hydro bushing according to an exemplary embodiment, the conical angle θ may be determined to range from −9 degrees to +9 degrees.

After the conical angle θ is determined as described above, a length of the linear section L corresponding to 10 to 30% of an entire stopper thickness while including a center of a thickness T of the stopper may be set on the surface of the contact end 48 of the stopper 47, as illustrated in FIGS. 4 and 5. Then, when there is no conical movement, a virtual line inclined by the conical angle θ with respect to a reference line O, extending in parallel to an axial line of the outer pipe 10 or the inner pipe 20, may extend from one start point S of the linear section L.

For example, when the length of the linear section L is less than 10% of the entire stopper thickness, the stopper may not sufficiently support a load transmitted through the inner pipe 20 and the elastic body 30 in a state in which there is no conical movement. Thus, wear of the elastic body 30 may be accelerated.

Meanwhile, when the length of the linear section L is greater than 30% of the entire stopper thickness, the linear section L of the stopper may interfere with the elastic body 30 during the conical movement, to cause wear of the elastic body 10 or damage to the nozzle 40.

Next, after determining an end point P at which one side surface, perpendicular to the reference line O, in the contact end 48 of the stopper 47 and the virtual line meet, a shape of the curved section C may be determined along a curve having a predetermined curvature and connecting one start point S of the linear section L and the end point P on the one side surface to each other.

Accordingly, the shape of the surface of the contact end 48 of the stopper 47 in the thickness direction may include a linear section L contacting the elastic body 30 in the load direction in a state in which there is no conical movement, and a pair of curved sections C contacting the elastic body 30 due to the inner pipe 20 relatively inclined with respect to the outer pipe 10 during the conical movement.

When the shape of the surface of the contact end 48 of the stopper 47 in the thickness direction is determined by reflecting the conical angle θ of the inner pipe 20 relatively inclined with respect to the axis of the outer pipe 10 during the conical movement, the surface of the contact end 48 of the stopper 47 has a shape corresponding to the elastic body that is in contact while being deformed depending on the conical movement in advance.

For example, a length of the linear section L on the contact end 48 of the stopper 47 may be smaller than a length of a linear section in a stopper according to the related art. Meanwhile, a length of the curved section C on the contact end 48 of the stopper 47 may be greater than a length of a curved section on a simply chamfering level in the stopper according to the related art.

Accordingly, in the hydro bushing according to an exemplary embodiment, a contact area between the surface of the contact end 48 of the stopper 47 and the elastic body 30, for example, an internal surface of the liquid chamber portion 31 deformed during the conical movement may be secured to be maximum, as illustrated in FIG. 6.

Figure 7A:
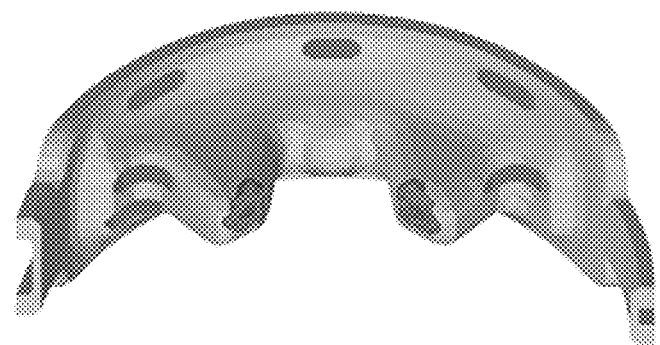
FIGS. 7A and 7B are views illustrating improvement of contact pressure of a stopper in a hydro bushing according to an exemplary embodiment in the present disclosure.
Figure 7B:
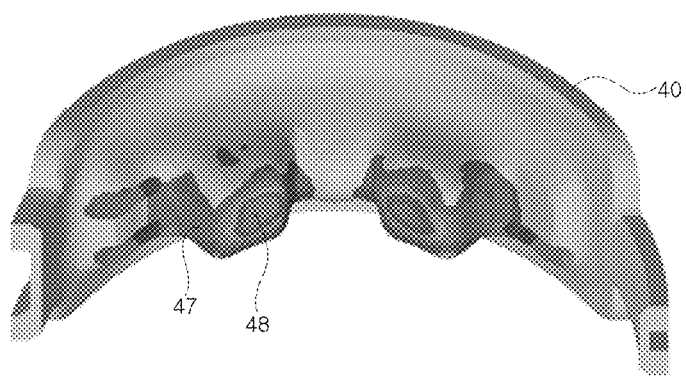

FIGS. 7A and 7B are views illustrating improvement of contact pressure of a stopper in a hydro bushing according to an exemplary embodiment.

The applicant of the present disclosure analyzed a contact pressure acting on a stopper 47 through simulation for a hydro bushing of the present disclosure.

For example, under the assumption that conical movement occurs while a load is applied in an actually main load direction, contact pressures acting on a stopper 47 of a nozzle 40 by an inner pipe 40 and an elastic body 30 were compared with each other in a hydro bushing according to the related art (see FIG. 7A) and a hydro bushing which a shape of a surface of a contact end 48 of a stopper 47 is determined according to an exemplary embodiment (see FIG. 7B).

In the hydro bushing according to an exemplary embodiment, a circumferential shape of the surface of the contact end 48 of the stopper 47 was determined by an outer radius of an inner pipe disposed by moving a center point of the inner pipe 20 by a gap N, and a shape of the contact end 48 of the stopper 47 in a thickness direction was determined by reflecting a conical angle θ of the inner pipe 20 relatively inclined with respect to an axial line of the outer pipe 10 during the conical movement and a decreased length of a linear section L. Accordingly, the surface of the contact end 48 on the stopper of the nozzle 40 may be brought into contact with the elastic body 30 with a maximum area, so that contact pressure may be distributed.

Accordingly, it can be seen that in a state in which conical movement occurs while applying a load in a main load direction, the contact pressure received by the contact end 48 of the stopper 47 may be reduced by about 30% in the hydro bushing of the present disclosure, as compared with the hydro bushing according to the related art.

Accordingly, in the hydro bushing according to an exemplary embodiment, when the axes of the outer pipe 10 and the inner pipe 20 are parallel to the vertical direction of the vehicle, for example, when the axes of the outer pipe 10 and the inner pipe 20 are disposed to be perpendicular to the ground, the elastic body 30 in contact with the nozzle 40 may prevented from being excessively worn or damage to the elastic body 30 or the nozzle may be prevented in spite of greater conical movement and load caused by bumping or rebounding of a wheel. Thus, durability of the entire bushing may be improved.

As described above, according to an exemplary embodiment, the durability of the entire bushing may be improved while maintaining noise, vibrations, and harshness (NVH) reduction performance.

While exemplary embodiments have been shown and described above, it will be apparent to those skilled in the art that modifications and variations could be made without departing from the scope of the present disclosure as defined by the appended claims.

What is claimed is:

1. A hydro bushing comprising:
   an outer pipe;
   an inner pipe disposed within the outer pipe and spaced apart from the outer pipe;
   an elastic body disposed between the outer pipe and the inner pipe and provided with a liquid chamber portion accommodating liquid therein; and
   a nozzle disposed between the outer pipe and the elastic body and including a stopper extending toward the liquid chamber portion such that a portion of an internal surface of the nozzle protrudes to be in contact with the liquid chamber portion,
   wherein a surface of a contact end of the stopper has a circumferential shape formed in a circumferential direction of the inner pipe, and the circumferential shape has the same circumferential curvature as an outer radius of the inner pipe, a gap in a load direction is present between the nozzle and the elastic body, and the circumferential shape of the surface of the contact end is formed based on a movement of a virtual circle by the gap with respect to a center point of the inner pipe, a radius of the virtual circle corresponds to an outer radius of the inner pipe.

2. The hydro bushing of claim 1, wherein the gap ranges from 1.5 mm to 3 mm.

3. The hydro bushing of claim 1, wherein the hydro bushing is disposed on an installation object such that an axial line of the outer pipe or the inner pipe is perpendicular to a ground.

4. A hydro bushing comprising:

an outer pipe;

an inner pipe disposed within the outer pipe and spaced apart from the outer pipe;

an elastic body disposed between the outer pipe and the inner pipe and provided with a liquid chamber portion accommodating liquid therein; and a nozzle disposed between the outer pipe and the elastic body and including a stopper extending toward the liquid chamber portion such that a portion of an internal surface of the nozzle protrudes to be in contact with the liquid chamber portion, wherein a surface of a contact end of the stopper comprises:

a linear section extending in a thickness direction of the stopper; and a curved section continuous with the linear section and contacting the elastic body during conical movement, and a length of the linear section is within a range of 10% to 30% of a thickness of the stopper.

5. The hydro bushing of claim 4, wherein the inner pipe is relatively inclined by a conical angle with respect to the outer pipe during the conical movement, the linear section is set on the surface of the contact end to include a center of a thickness of the stopper, a virtual line inclined by the conical angle with respect to a reference line extending in parallel to an axial line of the outer pipe is extended from one start point on the linear section toward one side surface of the stopper to determine an end point at the one side surface of the stopper, and the curved section is formed along a curve connecting the start point and the end point to each other.

6. The hydro bushing of claim 5, wherein the conical angle ranges from −9 degrees to +9 degrees.

* * * * *